(12) United States Patent
Inkinen et al.

(10) Patent No.: US 6,292,858 B1
(45) Date of Patent: *Sep. 18, 2001

(54) ELECTRONIC DEVICE, CARD INTERFACE AND EXPANSION CARD WITH TRANSPOSITION OF SIGNAL AND VOLTAGE LINES

(75) Inventors: Sami Inkinen; Mikko Terho, both of Tampere (FI)

(73) Assignee: Nokia Mobile Phones Ltd, Espoo (FI)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/958,841

(22) Filed: Oct. 28, 1997

(30) Foreign Application Priority Data

Oct. 31, 1996 (FI) ........................................................ 964398

(51) Int. Cl.⁷ .................................................... G06F 15/00
(52) U.S. Cl. ............................................ 710/102; 710/103
(58) Field of Search ................................... 395/281–283, 395/822, 308–309, 856–859; 710/101–103, 22, 128, 129, 36–39

(56) References Cited

U.S. PATENT DOCUMENTS

| | | | |
|---|---|---|---|
| 5,241,284 | 8/1993 | Nyqvist et al. | 330/297 |
| 5,263,178 | 11/1993 | Liukkonen | 455/76 |
| 5,291,542 | 3/1994 | Kivari et al. | 379/58 |
| 5,353,328 | 10/1994 | Jokimies | 379/58 |
| 5,378,935 | 1/1995 | Korhonen et al. | 327/114 |
| 5,386,567 * | 1/1995 | Lien et al. | 395/283 |
| 5,392,282 | 2/1995 | Kiema | 370/77 |
| 5,416,435 | 5/1995 | Jokinen et al. | 327/113 |
| 5,471,655 | 11/1995 | Kivari | 455/127 |
| 5,486,687 * | 1/1996 | Le Roux | 235/382 |
| 5,490,235 | 2/1996 | Von Holten et al. | 395/2.79 |
| 5,491,718 | 2/1996 | Gould et al. | 375/205 |
| 5,512,886 * | 4/1996 | Macko et al. | 340/825.6 |
| 5,514,995 * | 5/1996 | Hennig | 327/399 |
| 5,519,851 * | 5/1996 | Bender et al. | 395/500 |
| 5,570,369 | 10/1996 | Jokinen | 370/95.3 |
| 5,581,244 | 12/1996 | Jokimies et al. | 340/825.44 |
| 5,589,719 * | 12/1996 | Fiset | 307/131 |
| 5,596,571 | 1/1997 | Gould et al. | 370/335 |
| 5,613,130 * | 3/1997 | Teng et al. | 395/750.01 |
| 5,613,235 | 3/1997 | Kivari et al. | 455/343 |
| 5,642,063 | 6/1997 | Lehikoinen | 327/74 |
| 5,664,118 * | 9/1997 | Nishigaki et al. | 395/283 |
| 5,701,515 * | 12/1997 | Gradeler | 395/834 |
| 5,809,115 * | 9/1998 | Inkinen | 379/93.05 |
| 5,847,553 * | 12/1998 | Beuadoin et al. | 323/282 |
| 5,937,157 * | 8/1999 | Oshiyama et al. | 713/200 |
| 6,044,472 * | 3/2000 | Crohas | 713/300 |

FOREIGN PATENT DOCUMENTS

WO 96/10258 4/1996 (WO).

OTHER PUBLICATIONS

PCMCIA Specification, 1992.*

* cited by examiner

Primary Examiner—Robert Beausoleil
Assistant Examiner—Raymond N Phan
(74) Attorney, Agent, or Firm—Perman & Green, LLP (57) ABSTRACT

An expansion card interface of an electronic device (2) in accordance with the invention comprises at least one expansion card connector (33a) comprising a contact pin ($V_{cc1}$, $V_{cc2}$, $V_{pp1}$, $V_{pp2}$) for transferring a given signal. The electronic device (2) further comprises a power supply (11), such as a battery or a mains supply (14). A voltage ($V_{batt}$) of the power supply (11) of the electronic device can be connected to said contact pin ($V_{cc1}$, $V_{cc2}$, $V_{pp1}$, $V_{pp2}$) instead of said signal.

26 Claims, 10 Drawing Sheets

ELECTRONIC DEVICE, CARD INTERFACE AND EXPANSION CARD WITH TRANSPOSITION OF SIGNAL AND VOLTAGE LINES

BACKGROUND OF THE INVENTION

The present invention relates to an expansion card interface according to the preamble of claim 1, electronic device according to the preamble of claim 10, and expansion card according to the preamble of claim 19.

A PCMCIA interface (Personal Computer Memory Card International Association) is one known interface which is used in connection with electronic devices to connect expansion cards, such as memory cards (for example flash memory cards), wired line modems and various kinds of input/output cards (I/O), to an electronic device. Such electronic devices and PCMCIA cards include connectors according to PCMCIA standard, for example such that the connector of electronic device is a so-called male connector (connector with contact pins), and the connector of the interface card is a so-called female connector (connector with jointing sleeves). Thus, an electrical contact is formed between each contact pin and the corresponding jointing sleeve when the interface card is connected to the connector of the electronic device. The PCMCIA standard defines the normal function of each contact pin and each jointing sleeve respectively. Thus, for example in an application where PCMCIA interface is realized in a computer, each data line of the data bus of the computer is connected to one of the contact pins of the PCMCIA interface. Additionally, at least a part of the address and control lines are connected to the connector.

The connection between power supply of the electronic device and the PCMCIA interface is not defined in PCMCIA standard, wherein many alternative implementations exist in electronic devices. A battery is normally used as a power supply of portable electronic data processors. Typically, an application specific integrated circuit (ASIC) is used to control the current supply to the PCMCIA interface. Many types of current supply circuits, such as regulators and voltage converters, can be used between the battery and contact pins, the type of the current supply circuit being affected by the architecture of the electronic device and the internal operating voltage.

The PCMCIA cards have a size of a credit card (85.6 mm×54 mm), but the thickness of the cards can be 3.3 mm (type I), 5.0 mm (type II) or 10.5 mm (type III). Electrically the PCMCIA cards are connected to the electronic device as 8/16 bit I/O interface or memory. According to the PCMCIA standard, the PCMCIA card will have a memory area which can be read by an electronic device. This memory area includes information to identify the card. This information is called a card information structure (CIS) database. The card information structure includes tuples whereby every tuple includes definite information. Table 1 describes a CIS database tuple 1 which, in this case, includes information about the manufacturer of the card. The first field of the tuple, which is situated in address 0, informs the type of the tuple (=CISTPL_MANFID). The following field (situated in address 2) informs the link to the next tuple. The contents of this field can be used for designating the end of this tuple and the beginning of the next tuple. The value 4H (Hexadecimal) in the example of Table 1 informs that the number of information fields in this tuple is four.

TABLE 1

| Byte | Value | Description |
| --- | --- | --- |
| 00 | 20H | CISTPL_MANFID |
| 02 | 04H | Link to the next tuple |
| 04 | xxH | Manufacturer ID (LSB) |
| 06 | yyH | Manufacturer ID (MSB) |
| 08 | xxH | Manufacturer identification (LSB) |
| 0AH | yyH | Manufacturer identification (MSB) |
| 0CH | xxH | Beginning of the next tuple |

The power supply of the interface cards connected to the connector is normally implemented so that one or more operating voltages required for the card are connected from the electronic device via the connector. Thereby there will normally be no separate voltage sources used in the cards. This is a useful solution if the power consumption of the card is low. In practical embodiments, the maximum intensity of current that can be led to the card via contact pins is defined. This value may be different in different types of cards. For example, the maximum intensity of current allowed for each contact pin of said PCMCIA interface is about 0.5 A according to the PCMCIA standard. However, the PCMCIA standard does not define the maximum intensity of current of a PCMCIA card accurately. In practical embodiments, the upper limit of the intensity of current is about 1.0 A, because in connection with the PCMCIA cards usually two pins are used in the supply of each operating voltage. According to the PCMCIA standard, it is further recommended that the maximum intensity of current of the PCMCIA card during the start up of the apparatus should be limited to about 100 mA. Problems may arise with cards having a power consumption such that the current of the operating voltage pin exceeds the maximum allowable value or is close to this value. Temporary exceedings may not necessarily cause any damage but they can, however, shorten the operating life of the connector. Another drawback is that the power consumption of the card increases the power consumption of the electronic device, this being partly caused by the internal resistance of electronic device in the current supply circuit of the operating voltage pins.

Figure 1:
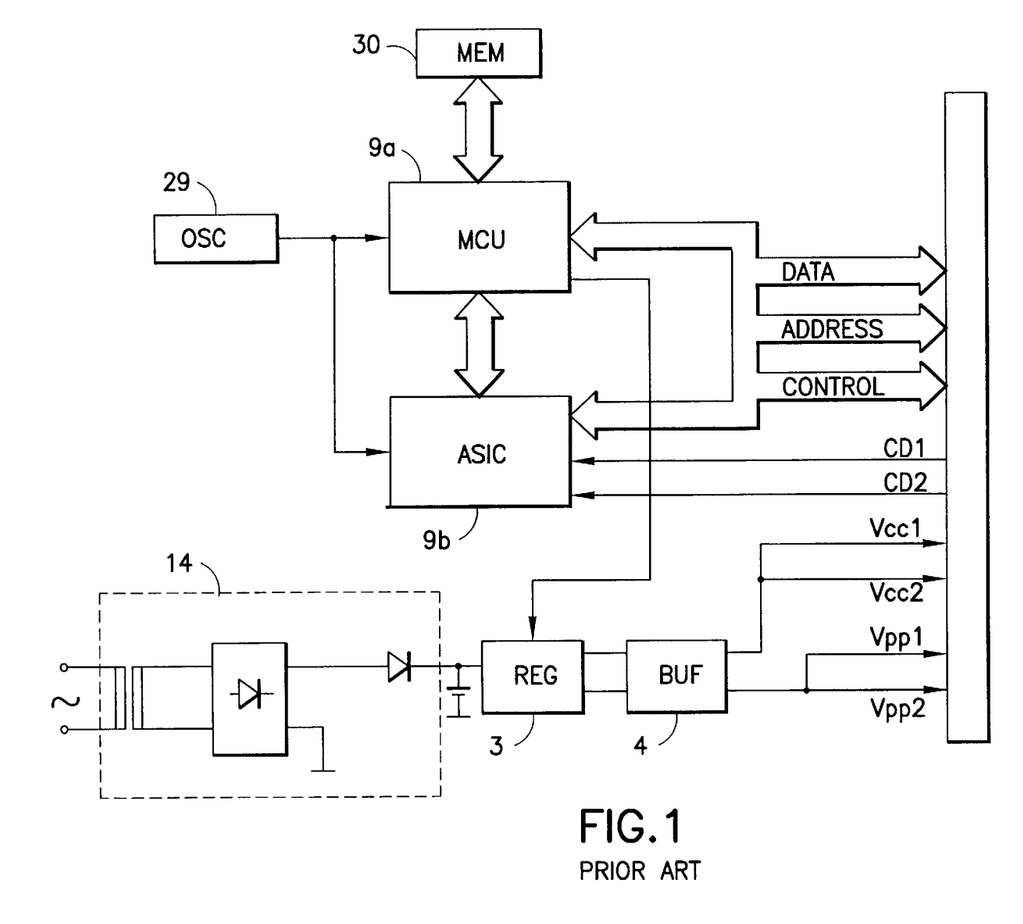
FIG. 1 shows a reduced block diagram of a prior art PCMCIA connection in an electronic device.

When connecting a PCMCIA card to a (powered) electronic device, it reads the information included in a CIS database stored in the PCMCIA card. The connecting of the card can be detected for example in the following way. The card grounds by card sense lines CD1', CD2'the card detect pins CD1, CD2 in the connector, wherein an interrupt signal is generated to the processor of the electronic device. This will initiate the processor to run an interrupt service program including the necessary steps, such as to switch on the voltages to the card and to read the CIS database. FIG. 1 illustrates one PCMCIA interface in an electronic device as a reduced block diagram.

The operating voltage is supplied to the PCMCIA card via two operating voltage pins of the PCMCIA interface: $V_{cc1}$, $V_{cc2}$. According to the card version used, the operating voltage can be advantageously 3.3 V, 5.0 V or it can be selected to be either 3.3 V or 5.0 V. In case the voltage can be selected, the selection is controlled by data of the CIS database. Further, the PCMCIA interface has two programming voltage pins $V_{pp1}$, $V_{pp2}$ which are used only for programming of FLASH memory cards in known PCMCIA connections. These pins can advantageously be set at either 0 V, 12 V or at an operating voltage $V_{cc}$, according to the data of the CIS database.

The voltage which is directed to the operating voltage pins $V_{cc1}$, $V_{cc2}$ is regulated, whereby power loss is effected in the regulator. The degree of the power loss is affected e.g. by the difference between the input and output voltages of the regulator and also by the current consumed by the PCMCIA card which is connected to the PCMCIA interface in the operating voltage pins $V_{cc1}$, $V_{cc2}$. The greater the resistance between the power supply and the operating voltage pins $V_{cc1}$, $V_{cc2}$ of the PCMCIA interface, the greater the power consumption and the voltage loss in the electronic device when the power consumption of the PCMCIA card is high.

Figure 2A:
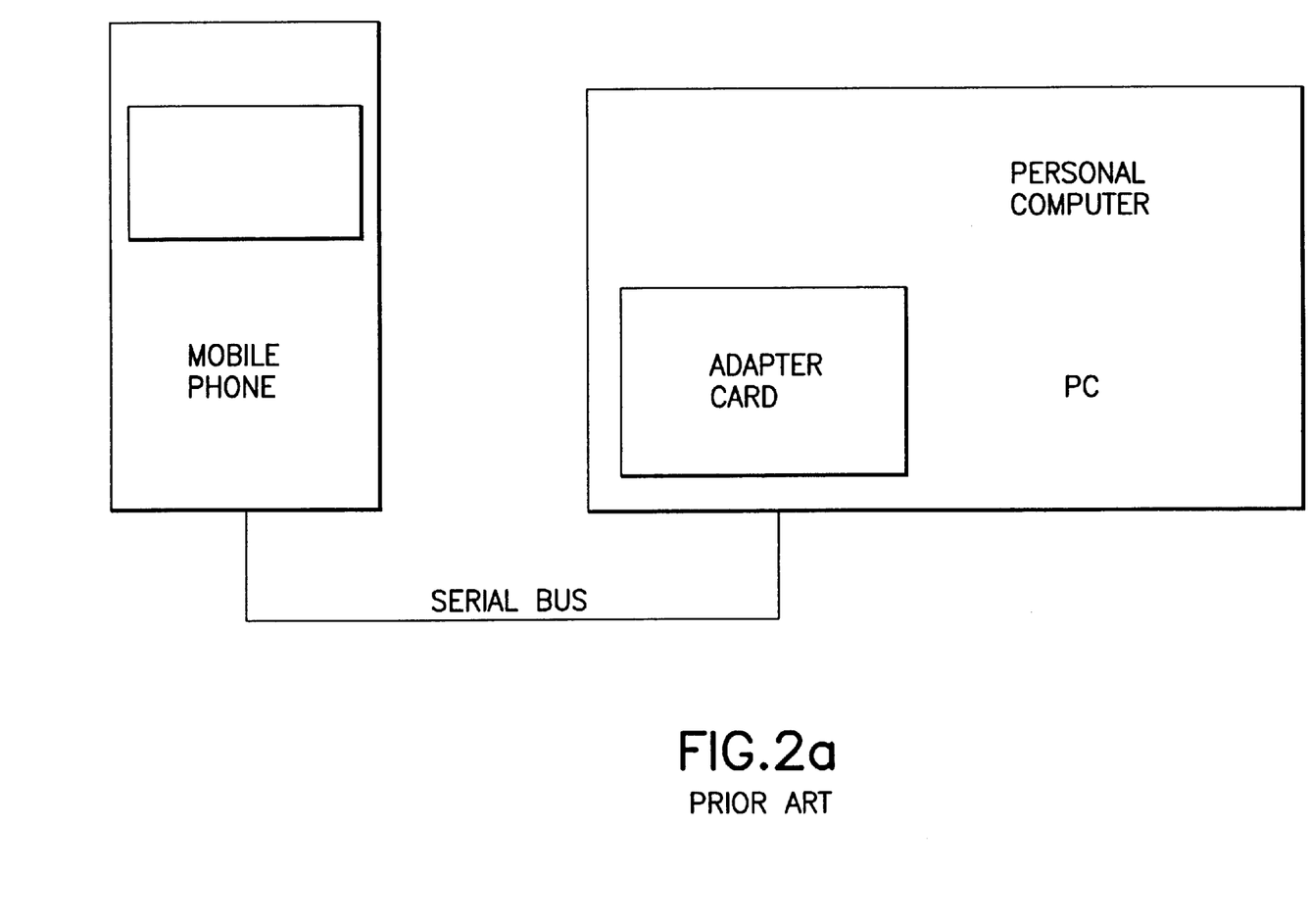
FIG. 2a shows a prior art mobile phone connected to a prior art expansion card interface of a PC by an expansion card.
Figure 2B:
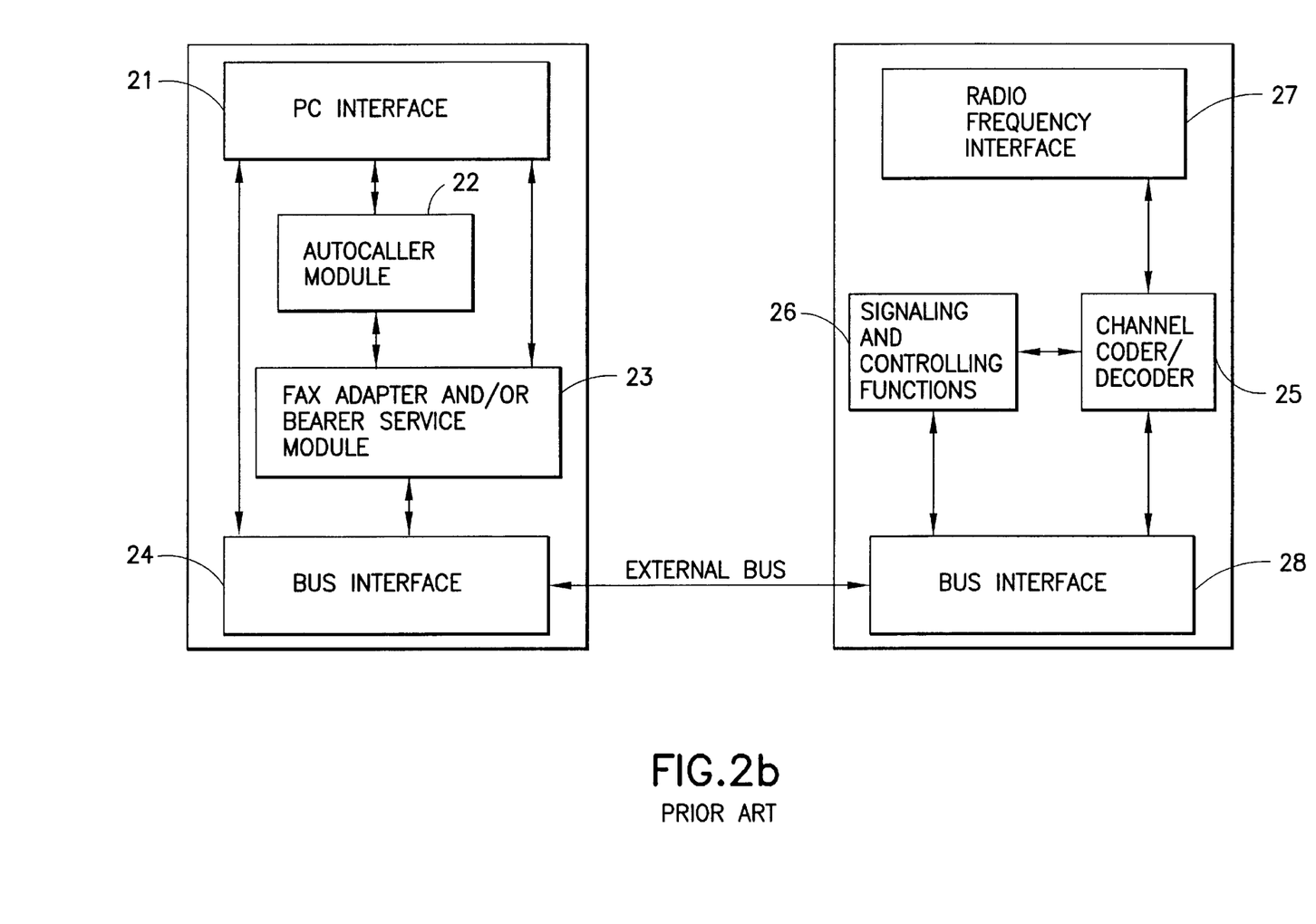
FIG. 2b shows functional blocks of an expansion card related to an expansion card interface of a PC and a transmitter/receiver unit of a mobile station in accordance with FIG. 2a, FIG. 3 shows a reduced block diagram of a transmitter/receiver unit of one mobile station placed in a prior art expansion card.

In the following, it is described the data transmission from a PC by a mobile phone connected by an expansion card to a known expansion card connector of the PC, as is presented in FIG. 2a. FIG. 2b illustrates the operational blocks of the expansion card which can be connected to the expansion card connector of the PC and the operational blocks of the transmitter/receiver unit of the mobile phone. The operational blocks also illustrate the functional details of the units. The block 21 of the expansion card includes the standard interface whereby the connection to the PC is provided. The block 22 of the expansion card is an automatic calling module interpreting the commands, such as AT and V.25bis commands, i.e., so-called modem commands, sent from the PC to the card. The actual data, such as a facsimile transmission, is led from the connection block 21 to the adaptation and network service module 23 which converts the output data to the protocol required by the network service used. The data in the correct protocol form is led via a bus connection 24 to a fast serial bus.

The data coming via the serial bus enters a bus interface block 28 in a mobile phone. The bus interface block 28 directs the data according to the address information included in the data, either to a signalling and control block 26 or to a channel coder of the phone. The signalling and control block 26 is, in practice, the microprocessor of the phone. The channel coder of the phone is a digital signal processor DSP. The data is readily provided in a form that it can be directly led to the input/output port of the processors, wherein no conversions need to be made. The channel coder in block 25 codes both the control data from the block 26 and the traffic message from an external bus, such as a fax-message, whereby the coded information will be sent to the radio path via a radio unit 27.

When the data is coming from the radio path to the terminal, the process is completely understood by the explanation above. The data received from the radio path is decoded in a decoder 25. The decoded data is directed as control data or traffic data as such to the bus interface block 26 which adapts the data to the external bus. In the adapter, the functional steps are made in reverse order compared to the data transmission of the terminal explained above.

Figure 3:
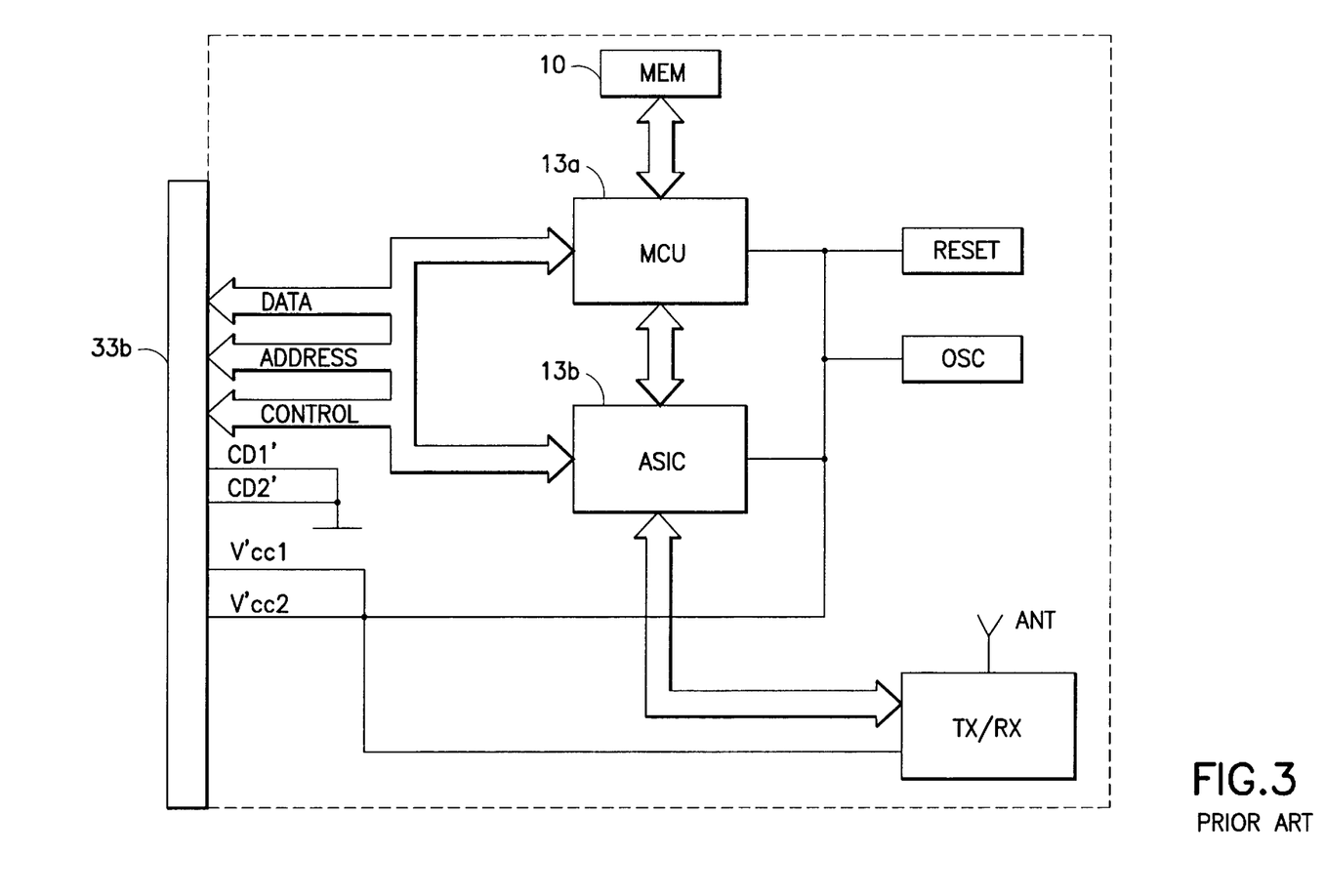

In particular, in connection with portable data processors (PC), mobile station adaptations have been designed, in which at least the transmitter/receiver unit TX/RX of the mobile station is provided in the PCMCIA standard card form. FIG. 3 illustrates a reduced block diagram of a transmitter/receiver unit of one mobile station positioned in a prior art PCMCIA card. The unit controlling the operation of the card is advantageously a microcontroller 13a (MCU) having e.g. a processor, memory (RAM, ROM), and input/output lines for connecting the microprocessor to the other electronics of the card. In addition, external memory 10 can be connected to the microcontroller 13a.

A transmitter TX comprises e.g. a modulator for modulating the signal to be sent, filters in particular for attenuating spurious emissions, a mixer in which the modulated signal is mixed to the local oscillator frequency for creating a radio frequency signal, and a power amplifier for amplifying the signal to be sent. The amplified signal is directed to an antenna ANT, which is connected to the card e.g. by means of a cable. A receiver RX comprises e.g. filters for filtering the received signals, a mixer for changing the radio frequency signal to be received to an intermediate frequency or, in a direct-change type receiver, to a baseband, and a detector for demodulating the received signal. Furthermore, the card has connection circuits, such as a control circuit 13b (ASIC), for transferring of signals between the PC and the transmitter/receiver. The transmitter/receiver unit has no power supply of its own, but the power supply is provided from the PC via the PCMCIA connection.

The watch-dog circuit RESET of the expansion card keeps the microcontoller 13a of the card at the initial phase of the operating voltage if the operating voltage of the card is, for some reason, insufficient. Thus, malfunctions of the microcontroller are eliminated e.g. during the coupling of the voltages.

Power consumption of the transmitter/receiver card varies during the operation. The power amplifier of the transmitter consumes a lot of power, wherein the power consumption is particularly high during the transmission. Since the card obtains the required operating voltage from the PC via the PCMCIA interface, the high power consumption causes the fact that the maximum current limit of the voltage pins is exceeded. The connector may be damaged, in case the PC or the card has no current restriction for hindering the exceeding of the current limit. On the other hand, the restriction of the current also restricts the initial power of the power amplifier, i.e., the intensity of the signal to be sent to the radio path. This may result in deterioration of the connection quality or even interruption of the connection.

A high power consumption also includes the disadvantage that power losses in the current supply circuit of the PC increase, wherein a part of the power taken from the power supply of the PC turns into heat inside the PC, and, on the other hand, the operation time of the PC at a single charge decreases, because the battery is run down faster.

SUMMARY OF THE INVENTION

An object of the present invention is to decrease the above described drawbacks and to provide an expansion card interface whereby the intensity of the current that can be supplied via the connection to the expansion card can be increased to be higher than the current in connection with prior art connections, and to decrease voltage loss between the power supply of the electronic device and the interface. The invention is based on the idea that instead of said signal, the voltage of the power supply is arranged to be switched to the electronic device. The expansion card interface in accordance with one aspect of the invention is characterized in that a voltage of a power supply of the electronic device is connected to the contact pin instead of the signal. The electronic device in accordance with a second aspect of the invention is characterized in that a voltage of the power supply of the electronic device is directed to the contact pin instead of the signal. The expansion card in accordance with a third aspect of the invention is characterized in that the voltage of the power supply of the electronic device is connected to a jointing sleeve instead of the signal.

The present invention provides significant advantages over prior art solutions. By utilizing the interface of the invention, voltage losses can be diminished between the power supply of the electronic device and the interface. The internal power consumption of the electronic device decreases, wherein the heating up of the electronic device is minor than when prior art interfaces are used. Further, higher currents can be supplied to the expansion card.

In the following, the invention will be described in more detail with reference to the appended drawings. In the drawings

DETAILED DESCRIPTION OF THE INVENTION

Figures 4, 4A:
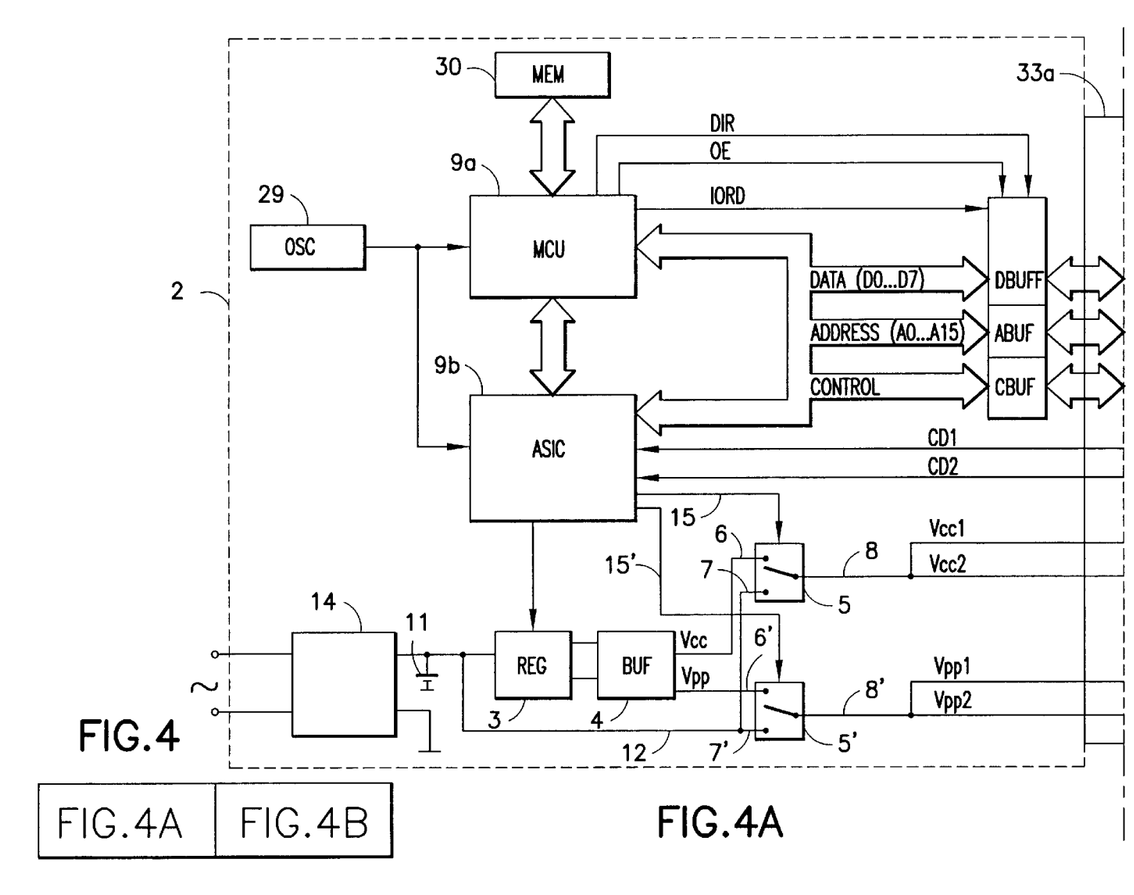
FIG. 4 shows a basic diagram of one advantageous embodiment of the expansion card interface in accordance with the invention.
Figure 4B:
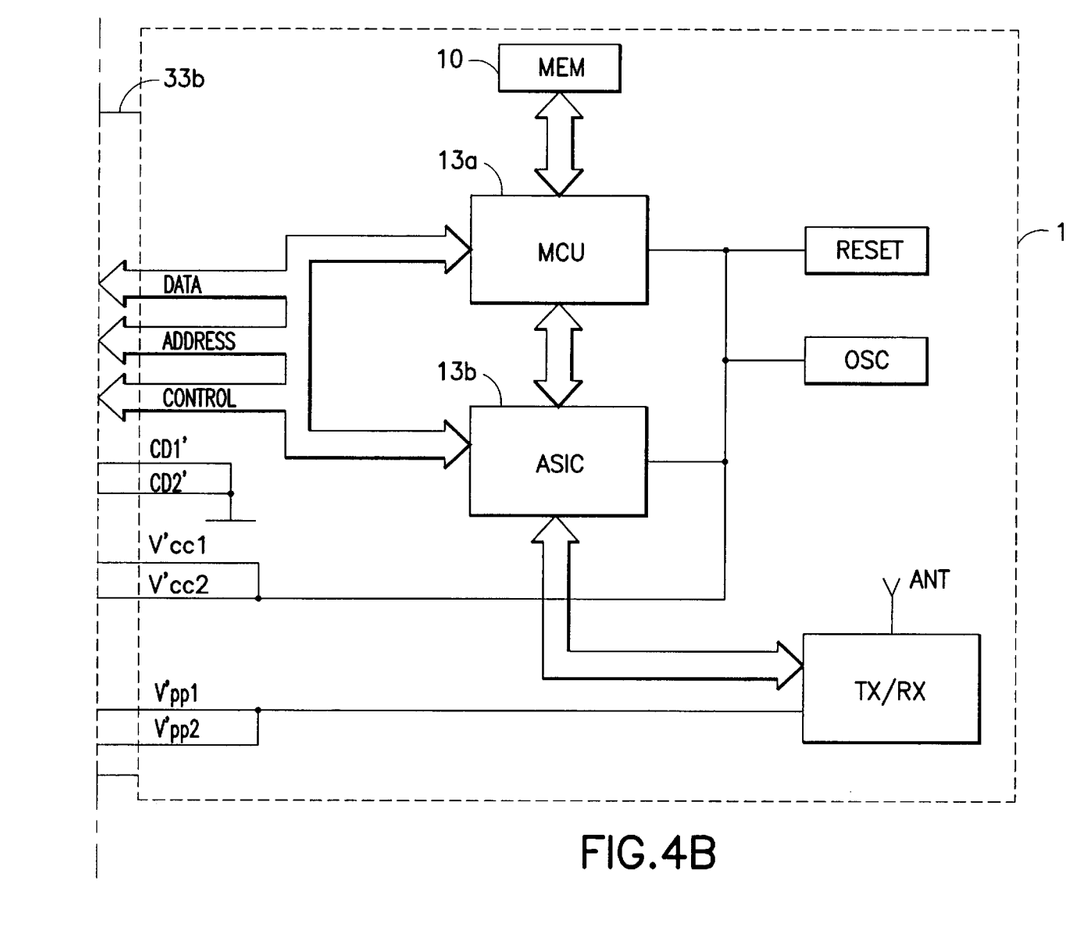

The accompanying FIG. 4 illustrates only those blocks which are necessary for the invention to be understood. In the embodiment in accordance with FIG. 4, the expansion card 1 is connected to the electronic device 2, such as a portable computer. The expansion card 1 can be any expansion card. In view of the interface 33a, only a few connection lines are shown in FIG. 4, such as power supply lines $V_{cc1}$, $V_{cc2}$, $V_{pp1}$, $V_{pp2}$. The electronic device 2 obtains its operating voltage from a power supply 11, which is advantageously a battery, or a mains supply 14. The mains supply 14 rectifies the mains supply and converts the rectified voltage to a voltage that is suitable to a current supply circuit 3, for example to +12V. Further, mains supply 14 can be used for charging the battery. The voltage value of the power supply $V_{batt}$ of the electronic device is insignificant as such in view of the operation of the present invention. The voltage value depends on the respective electronic device used and the value of the voltage or voltages used therein. In most common embodiments, such as the PCMCIA interfaces, the voltage $V_{batt}$ of the power supply 11 is higher than the operating voltage $V_{cc}$, but not more than +12V.

Usually, the voltage $V_{batt}$ of the power supply 11 is lowered in the current supply circuit, but also voltage increasing circuits and inverters are known, with which for example a negative output voltage is provided from a positive input voltage. However, losses take place in current supply circuit, wherein a part of the power supplied by the power supply 11 turns into heat. The amount of the losses depend e.g. on the amount of the current taken from the current supply circuit, wherein losses increase as the current value increase.

The first and second power supply line $V_{cc1}$, $V_{cc2}$, as well as the supply lines $V_{pp1}$, $V_{pp2}$ for the programming voltage, are in this interface provided by means of two contact pins for example for obtaining a higher current supply capacity for the expansion card 1.

From the power supply 11, the voltage $V_{batt}$ is directed to a current supply circuit 3, such as a regulator, wherein, depending on the embodiment, usually several voltages of various values, e.g. 3V, 5V, 12V and −12V are provided of the operating voltage. From the current supply circuit 3 the regulated operating voltage is directed to a buffer stage 4, where the regulated voltage or voltages are buffered, i.e., the current supply circuit is secured against spurious signals and short circuits coming through the interface. In the electric device of FIG. 4, in which the present invention is applied, two current supply lines $V_{cc}$, $V_{pp}$, start from the buffer stage 4. Switches 5, 5' are placed to these lines before the interface. The circuits determined for the power supply lines, which circuits are, in this case, the programming voltage line $V_{pp}$ and the operating voltage line $V_{cc}$ of the buffer stage 4, are interrupted in a manner that the circuits are not directed to the lines of said interface 33a, but to the switches 5, 5'. The first circuit, such as the operating voltage line $V_{cc}$ is directed to a first input pin 6 of the first switch 5.

The voltage $V_{batt}$ of the power supply 11 of the electronic device 2 is directed via a voltage line 12 to a second input pin 7 of the first switch 5. The voltage line 12 is advantageously an electric wire provided at the printed circuit board, but it can further comprise for example interference suppressers, if necessary. An output pin 8 of the first switch 5 is connected to the first and second operating voltage pin $V_{cc1}$, $V_{cc2}$ of the interface 33a. The second circuit, such as the programming voltage line $V_{pp}$ is directed to a first input pin 6' of the second switch 5'. The voltage $V_{batt}$ of the power supply 11 of the electronic device 2 is directed via the voltage line 12 to a second input pin 7' of the second switch 5'. An output pin 8' of the second switch 5' is connected to the first and second programming voltage pins $V_{pp1}$, $V_{pp2}$ of the interface 33a. A control unit 9 of the electronic device, such as a microprocessor 9a and control circuit 9b, directs the first switch 5 either to a first position, where the first input pin 6 is connected to the output pin 8 of the first switch, or to a second position, where the second input pin 7 is connected to the output pin 8 of the first switch. In a corresponding manner, the control unit 9 directs the second switch 5' either to a first position, where the first input pin 6' is connected to the output pin 8' of the second switch, or to a second position, where the second input pin 7' is connected to the output pin 8' of the second switch.

An oscillator 29, such as a crystal oscillator, provides one or several clock signals to the control unit 9 of the electronic device. Further, memory 30 is connected to the control unit 9. The memory comprises for example read-only memory e.g. for storing application software and random access memory for storing and reading the changing data.

The control of the switches 5, 5' is carried out by control lines 15, 15', advantageously in a manner that at the first value of the control line, e.g. about 0V, the switch 5, 5' is at said first position, and at the second value of the control line, e.g. about 5V, the switch 5, 5' is at said second position. The control can be carried out e.g. according to what is stored on the CIS database of the expansion card 1 connected to the expansion card interface 33a. The switches 5, 5' can be controlled also independently of each other, wherein they can be at different positions.

In a corresponding manner, the supply of operating voltages can be arranged by several manners in connection of the expansion card. The wiring can be fixed, wherein the operating voltage is wired from the respective operating-power supply sleeves of the interface 33b in the card either to all the circuits of the card, or to those circuits whose power consumption is the highest. In the latter case, a part of the circuits can be connected e.g. to a conventional supply sleeve $V'_{cc1}$, $V'_{cc2}$ of the operating voltage corresponding to the supply pin $V_{cc1}$, $V_{cc2}$ of the operating voltage and the unregulated voltage is directed via another sleeve, such as a jointing sleeve $V'_{pp1}$, $V'_{pp2}$ corresponding to the supply pin $V_{pp1}$, $V_{pp2}$ of the programming voltage. In the embodiment of FIG. 4, the operating voltage $V_{cc}$ or the voltage $V_{batt}$ of the power supply 11 of the electronic device is arranged to be connected to the supply pins $V_{pp1}$, $V_{pp2}$ of the programming voltage. A transmitter/receiver unit TX/RX is connected to the supply sleeves $V'_{pp1}$, $V'_{pp2}$ of the programming voltage on the expansion card, and the rest of the electronics of the card is connected to the standard supply sleeves $V'_{cc1}$, $V'_{cc2}$ of the operating voltage.

The expansion card interface of the FIG. 4 can be applied also in a manner that the operating voltage $V_{cc}$ or the voltage $V_{batt}$ of the power supply 11 of the electronic device can be connected to the supply pins $V_{cc1}$, $V_{cc2}$ of the operating voltage.

The CIS database is advantageously stored to a non-volatile random access memory (NVRAM) 10, which in this example is carried out by FLASH memory circuits. The CIS database is seen as memory at a given location. For example the PCMCIA standard includes a definition that the CIS database begins at an address 0 of the attribute memory. The reading of CIS database is carried out so that the processor of the electronic device sets the initial address of the CIS database to the address lines A0 to A15 of the card interface; the control line DIR of the transfer direction to a state where the data transfer direction of the data lines D0 to D7 is from the card to the electronic device; the data buffers enable line OE to a state where data buffers DBUFF are activated; and the data reading line IORD to the reading state. Thus, the first byte of the CIS database can be read in the data bus of the interface by the electronic device. The next byte is read according to a corresponding principle, by setting the address of the next byte to the address line. Said states of the control lines DIR, OE, IORD depend on the respective embodiment used, and they can be active low, which is known as such, i.e., a logic 0 state (voltage value about 0V in connection with common CMOS and TTL circuits) activates the function, or active high, i.e., a logic 1 state (about a voltage corresponding to the operating voltage in connection with common CMOS and TTL circuits) activates the function.

In situations when the power consumption of the expansion card is not very high the switch 5 is preferably set to a first position, i.e., the first input pin 6 is connected to conduct electricity to the output pin 8. In this case the operating voltage is supplied to the card only via the current supply connection of the electronic device. However, in connection with expansion cards with a high power consumption, about 0.5 A to 1.0 A, the switch 5 is set to a second position, i.e., the second input pin 7 is connected to conduct electricity to the output pin 8, wherein the unregulated voltage $V_{batt}$ of the power supply 11 is directed to the expansion card. In particular with mobile station embodiments, the accuracy demand with the operating voltage of the power amplifier of the transmitter is not that high that the operating voltage should be regulated. Thus, when applying the interface of the invention, the voltage losses between the power supply of the electronic device and the expansion card interface can be reduced, in particular in connection with expansion cards with a high power consumption.

Advantageously, the manufacturer of the expansion card has already at the manufacturing stage programmed to the CIS database the information that a voltage line 12 of the electronic device can be switched to the card, at one of the contact pins. By utilizing this information the electronic device can connect the operating voltage to the expansion card directly from the power supply 11, wherein the internal power losses of the electronic device can be reduced, which raises the operation time of the electronic device at one charge and also decreases heat forming in the electronic device.

Figures 5, 5A:
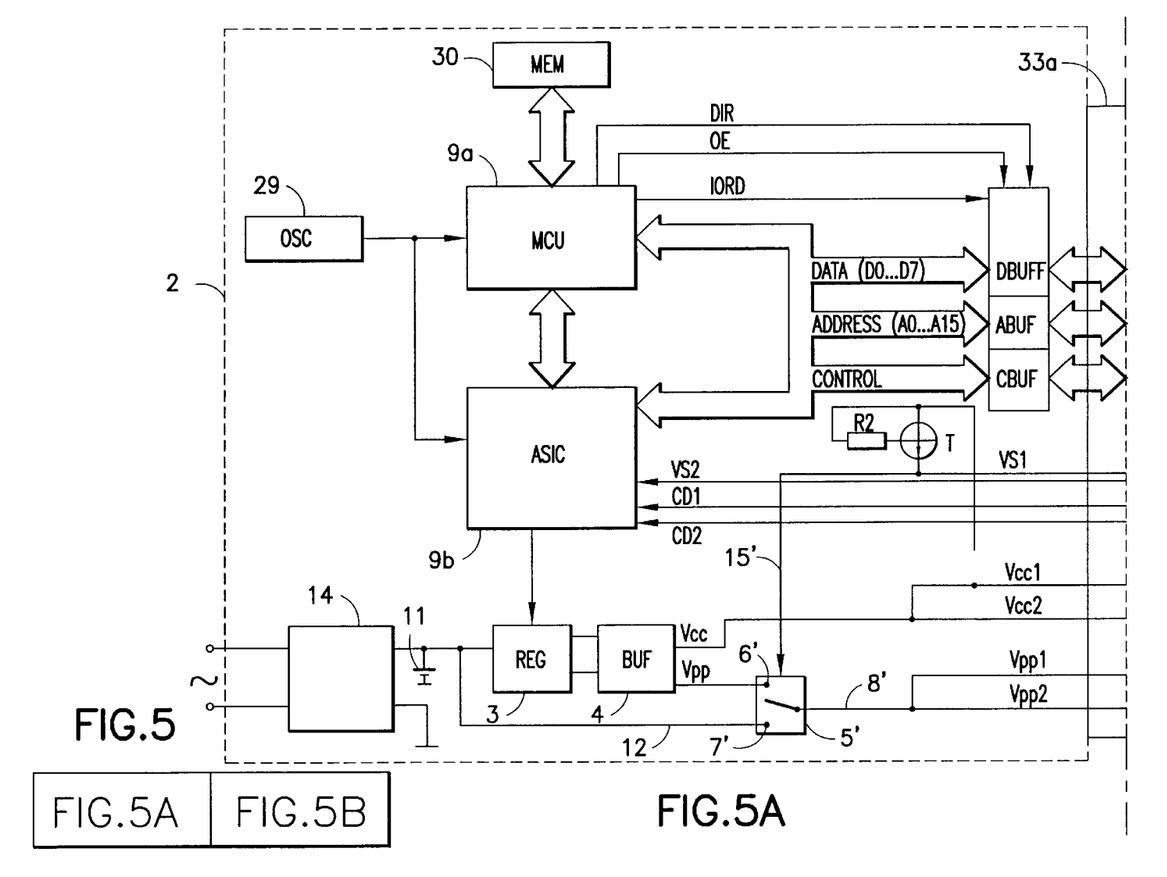
FIG. 5 shows a basic diagram of another advantageous embodiment of the interface in accordance with the invention.
Figure 5B:
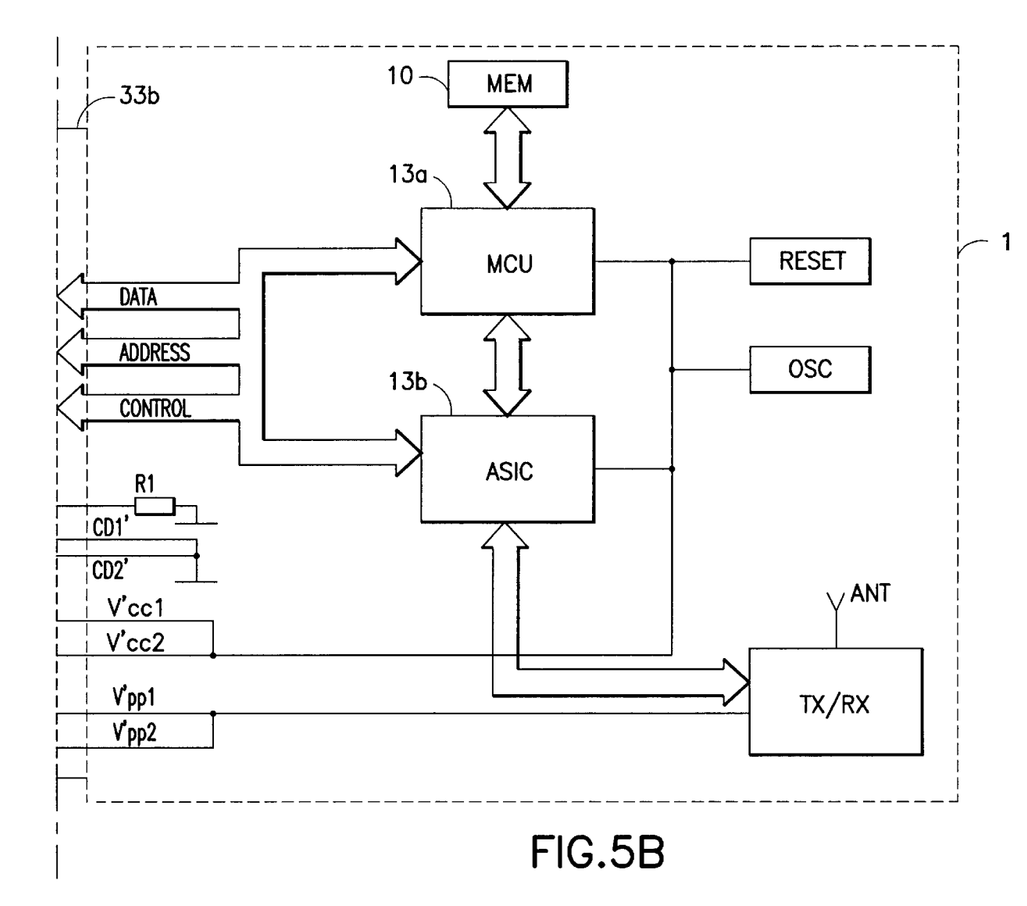

In addition to the fact that the connection of the operating voltage can be controlled on the basis of the use of the CIS database or the like, it is also possible to carry out the control on the basis of the apparatus. An embodiment of this is shown in FIG. 5. In the control, one of the contact pins of the expansion card connectors 33a is used, such as the voltage sense pins VS#1, VS#2. Thus, the expansion card sets said pins either to the 0 state (e.g. about 0V) or to the 1 state (e.g. about 5V) according to the fact whether the above described possibility to switch the operating voltage exists in the card. Furthermore, pull down or pull up can be utilized when carrying out the control. The switch principle shown in FIG. 5 is based on the use of a pull down resistance R1, wherein the electronic device advantageously includes an open emitter type output, which, in the coupling of FIG. 5 is carried out by an NPN transistor T, is connected to the first voltage sense pin VS#1. The operating point of the transistor is set by a resistance R2 connected between the base of the transistor and the operating voltage $V_{cc}$. The control line 15' of the switch 5' is connected to the emitter. In case the expansion card connector 33a includes no expansion card, or the card has no pull down resistance, the voltage level in the control line 15' is about 5V when an operating voltage of 5V is used in the circuits of the expansion card interfaces 33a. Thus, the switch 5' is at its first position, i.e., the operating voltage is directed to the expansion card from the power supply 11 of the electronic device via the current supply connection. In case the expansion card connected to the expansion card connector 33a includes a pull down resistance R1 connected electrically to a pin corresponding to the first voltage sense pin VS#1, the pull down resistance R1 causes the voltage to drop to about 0V in the control line 15' of the switch. Thus, the switch 5' is moved from one position to the other, i.e., the operating voltage is directed to the transmitter/receiver unit TX/RX in the expansion card directly from the power supply 11 of the electronic device.

Figure 6A:
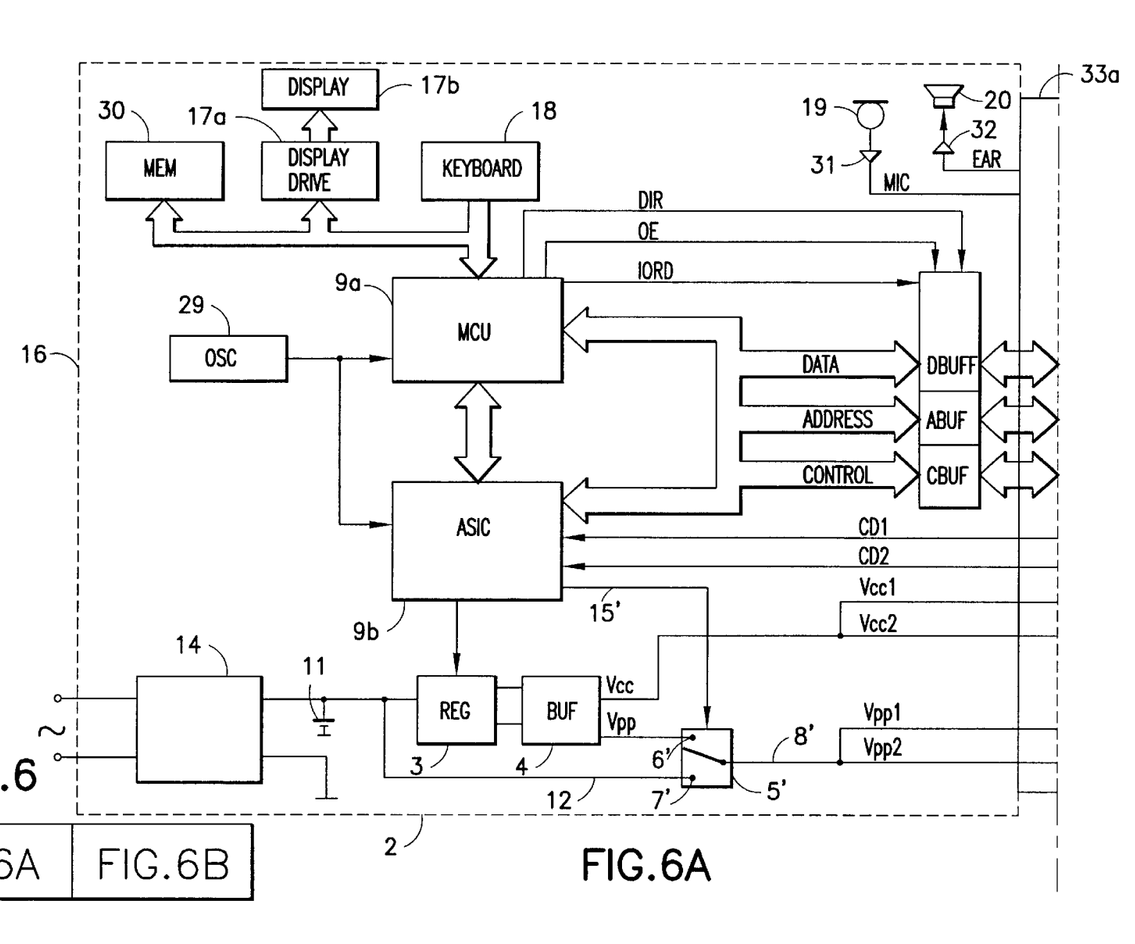
FIG. 6 shows a reduced block diagram of an expansion card interface according to an advantageous embodiment of the invention positioned inside a housing of a telephone.
Figure 6B:
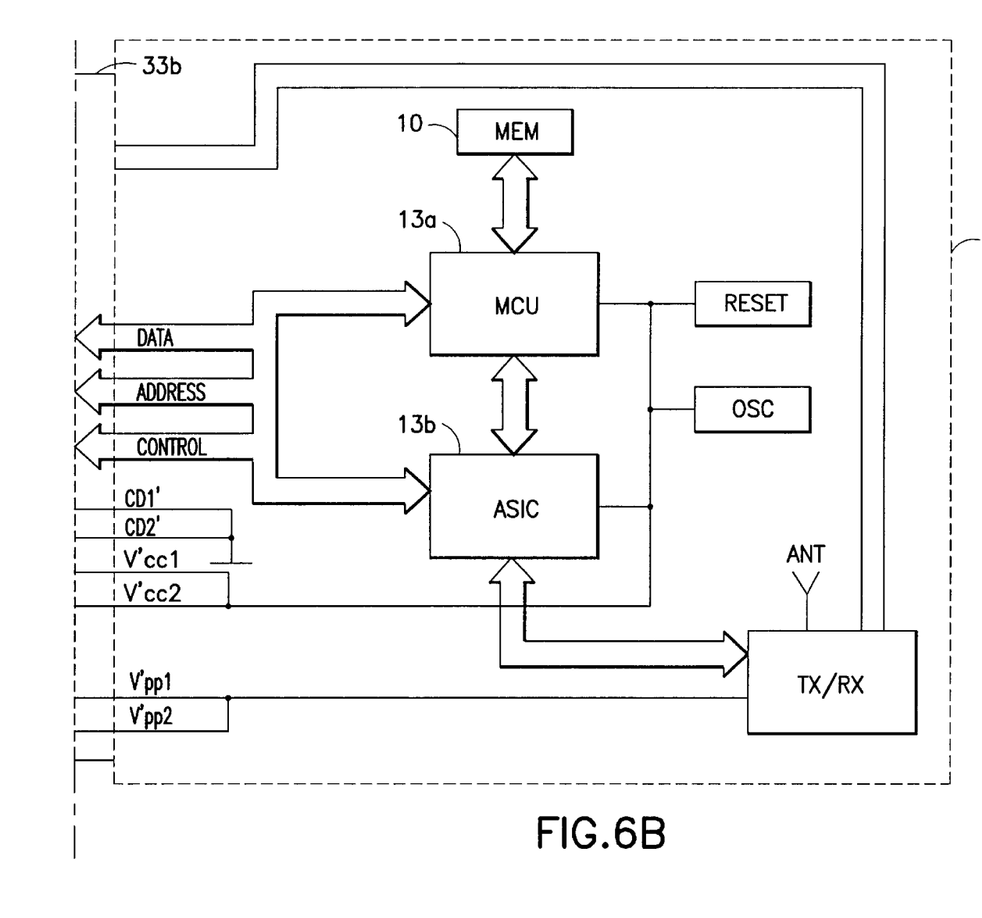

FIG. 6 illustrates a reduced block diagram of an expansion card interface in accordance with an advantageous embodiment of the invention, wherein the electronic device 2 is a handset 16 of a telephone. the telephone can be e.g. a mobile station, such as a GSM mobile station. The handset 16 advantageously includes a microphone 19, earphone 20, display driver 17a, display 17b and keypad 18. The expansion card 1 can be connected to the expansion card connector 33a, e.g. by pushing it through an opening (not shown) provided in the handset 16. The microphone 19 is coupled to the microphone contact pin MIC of the expansion card connector 33a through a microphone amplifier 31, and the earphone 20 is coupled to the earphone contact pin EAR of the expansion card connector 33a through an earphone amplifier 32. In the expansion card 1, the microphone and earphone lines are directed to the transmitter/receiver line TX/RX. The display driver 17a and the keypad 18 are connected to the control unit 9, wherein the application software in the microprocessor 9a of the control unit attends to that the controls from the keypad are transferred to the expansion card 1 and, in a corresponding manner, that the display messages from the expansion card 1 are transferred via the display driver 17a to the display 17b. The transfer of signals can be e.g. parallel, as in the embodiment shown in FIG. 6, or also serial form data transfer can be used between the electronic device 2 and the expansion card 1.

The operating voltage of the transmitter/receiver unit TX/RX can be selected by the second switch 5', as illustrated for example in the embodiment of FIG. 4. In this case the internal power consumption in the handset 16 of the telephone can be reduced by switching the switch 5' to a second position, wherein the transmitter/receiver unit obtains its operating voltage directly from the operating power supply 11 of the handset 16.

The present invention is not merely restricted to the embodiments described above, but it can be modified within the accompanying claims. For example the electronic device 2 used can be different from the ones presented above.

What is claimed is:

1. An expansion card interface of an electronic device (2) comprising:

a power supply (11) providing a supply voltage ($V_{batt}$), a power supply circuit (3) for creating a first operating voltage ($V_{cc}$) and a second operating voltage ($V_{pp}$) from the supply voltage ($V_{batt}$) of the power supply (11) of the electronic device, and a power selection switch;

at least one expansion card connector (33a) comprising a contact pin for transferring said first operating voltage to an expansion card (1) connected to the expansion card connector (33a), and a second contact pin for transferring said second operating voltage to the expansion card, the expansion card comprising at least a transmitter/receiver unit (TX/RX) of a mobile station, the transmitter/receiver unit being powered by the operating voltages; and wherein said power selection switch is operative to selectively switch a connection of said second contact pin from said second operating voltage ($V_{pp}$) of the power supply circuit to the voltage ($V_{batt}$) of the power supply to accomplish increased power flow from said power supply (11) to said transmitter/receiver unit than is provided by said power supply circuit (3), and simultaneously transferring said first operating voltage to the expansion card during a switching of said power selection switch.

2. An expansion card interface as set forth in claim 1, said interface comprising at least one expansion card connector (33a) at least one of whose contact pins is arranged to function as a supply pin ($V_{cc1}$, $V_{cc2}$) of the operating voltage for directing an operating voltage ($V_{cc}$) to an expansion card (1) connected to an expansion card connector (33a), the operating voltage ($V_{cc}$) being preferably created from the voltage ($V_{batt}$) of the power supply (11) of the electronic device by a power supply circuit, such as a regulator (3), wherein the operating voltage ($V_{cc}$) or the voltage ($V_{batt}$) of the power supply (11) of the electronic device is arranged to be connected to the supply pin voltage ($V_{cc1}$, $V_{cc2}$) of the operating voltage.

3. An expansion card interface as set forth in claim 1, said interface comprising at least one expansion card connector (33a), at least one of whose contact pins is arranged to function as a supply pin ($V_{pp1}$, $V_{pp2}$) of a programming voltage for directing the programming voltage ($V_{pp}$) to an expansion card (1) connected to the expansion card connector (33a), the programming voltage ($V_{pp}$) being preferably provided from the voltage ($V_{batt}$) of the power supply (11) of the electronic device by a power supply circuit, such as a regulator (3), wherein the operating voltage ($V_{cc}$) or the voltage ($V_{batt}$) of the power supply (11) of the electronic device is arranged to be connected the supply pin ($V_{pp1}$, $V_{pp2}$) of the programming voltage.

4. An expansion card interface as set forth in claim 2, wherein said expansion card (1) comprises a card information structure (CIS) database, wherein the connection is arranged to be carried out on the basis of the information included in the card information structure (CIS) database included in the expansion card.

5. An expansion card interface as set forth in claim 1, said interface comprising one or several control pins (VS#1, VS#2), wherein the control pin is arranged to be set advantageously to two states, wherein said signal is connected to the contact pin on the first state of the control pin, and the voltage ($V_{batt}$) of the power supply (11) of the electronic device is connected to the contact pin on the second state of the control pin.

6. An expansion card interface as set forth in claim 5, wherein the second state of the control pin is arranged to be set by a pull down resistance (R1).

7. An expansion card interface as set forth in claim 1, wherein the electronic device (2) is a data processor, such as a portable computer.

8. An expansion card interface as set forth in claim 1, wherein the electronic device (2) is a handset (16) of a telephone.

9. An expansion card interface as set forth in claim 1, wherein the power supply (11) is a battery or a mains supply (14).

10. An electronic device (2) comprising:

a power supply (11) providing a supply voltage ($V_{batt}$), a power supply circuit (3) for creating a first operating voltage ($V_{cc}$) and a second operating voltage ($V_{pp}$) from the supply voltage ($V_{batt}$) of the power supply (11) of the electronic device, and a power selection switch;

at least one expansion card connector (33a) comprising a contact pin for transferring said first operating voltage to an expansion card (1) connected to the expansion card connector (33a), and a second contact pin for transferring said second operating voltage to the expansion card, the expansion card comprising at least a transmitter/receiver unit (TX/RX) of a mobile station, the transmitter/receiver unit being powered by the operating voltages; and wherein said power selection switch is operative to selectively switch a connection of said second contact pin from said second operating voltage ($V_{pp}$) of the power supply circuit to the voltage ($V_{batt}$) of the power supply to accomplish increased power flow from said power supply (11) to said transmitter/receiver unit than is provided by said power supply circuit (3), and simultaneously transferring said first operating voltage to the expansion card during a switching of said power selection switch.

11. An electronic device (2) as set forth in claim 10, said electronic device comprising at least one expansion card connector (33a) at least one of whose contact pins is arranged to function as the supply pin ($V_{cc1}$, $V_{cc2}$) of an operating voltage for directing the operating voltage ($V_{cc}$) to an expansion card (1) connected to the expansion card connector (33a), the operating voltage ($V_{cc}$) being preferably provided from the voltage ($V_{batt}$) of the power supply (11) of the electronic device by a power supply circuit, such as a regulator (3), wherein the operating voltage ($V_{cc}$) or the voltage ($V_{batt}$) of the power supply (11) of the electronic device is arranged to be connected to the supply pin ($V_{cc1}$, $V_{cc2}$) of the operating voltage.

12. An electronic device (2) as set forth in claim 10, said electronic device comprising at least one expansion card connector (33a), at least one of whose contact pins is arranged to function as a supply pin ($V_{pp1}$, $V_{pp2}$) of a programming voltage for directing the programming voltage ($V_{pp}$) to an expansion card (1) connected to the expansion card connector (33a), the programming voltage ($V_{pp}$) being preferably provided from the voltage ($V_{batt}$) of the power supply (11) of the electronic device by a power supply circuit, such as a regulator (3), wherein the operating voltage ($V_{cc}$) or the voltage ($V_{batt}$) of the power supply (11) of the electronic device is arranged to be connected to the supply pin ($V_{pp1}$, $V_{pp2}$) of the programming voltage.

13. An electronic device (2) as set forth in claim 11, wherein said expansion card (1) comprises a card information structure (CIS) database, and the connection is arranged to be carried out on the basis of the information included in the card information structure (CIS) database included in the expansion card.

14. An electronic device (2) as set forth in claim 10, said electronic device (2) comprising one or several control pins (VS#1, VS#2), wherein the control pin is arranged to be set advantageously to two states, wherein said signal is connected to the contact pin on the first state of the control pin, and the voltage ($V_{batt}$) of the power supply (11) of the electronic device is connected to the contact pin on the second state of the control pin.

15. An electronic device (2) as set forth in claim 14, wherein the second state of the control pin is arranged to be set by a pull down resistance (R1).

16. An electronic device (2) as set forth in claim 10, wherein it is a data processor, such as a portable computer.

17. An electronic device (2) as set forth claim 10, wherein it is a handset (16) of a telephone.

18. An electronic device (2) as set forth in claim 10, wherein the power supply (11) is a battery or a mains supply (14).

19. An expansion card (1) comprising:
at least one expansion card connector (33b) to be connected to the expansion card connector (33a) of an electronic device (2), said expansion card connector (33b) of the expansion card comprising:
at least one supply pin of a regulated operating voltage ($V_{cc}$, $V_{pp}$) for directing the operating voltage to an expansion card (1) connected to the expansion card connector (33a), the expansion card comprising at least a transmitter/receiver unit (TX/RX) of a mobile station, the transmitter/receiver unit being powered by the operating voltage;
a jointing sleeve ($V'_{cc1}$, $V'_{cc2}$, $V'_{pp1}$, $V'_{pp2}$) for transferring a given signal comprising said operating voltage ($V_{cc}$, $V_{pp}$), and said electronic device (2) comprising a power supply (11) and a power selection switch, wherein the voltage ($V_{batt}$) of the power supply (11) of the electronic device is unregulated and can be connected to said jointing sleeve instead of said operating voltage by operation of said power selection switch.

20. An expansion card (1) as set forth in claim 19, wherein to the expansion card connector (33b) of the expansion card one or several power supply sleeves ($V'_{cc1}$, $V'_{cc2}$, $V'_{pp1}$, $V'_{pp2}$) are arranged for supplying regulated voltage to the expansion card (1) having two or several circuits, wherein a part of the circuits is connected to said jointing sleeve ($V'_{cc1}$, $V'_{cc2}$, $V'_{pp1}$, $V'_{pp2}$) and a part of the circuits is connected to the power supply sleeve ($V'_{cc1}$, $V'_{cc2}$, $V'_{pp1}$, $V'_{pp2}$).

21. An expansion card (1) as set forth in claim 19, wherein it comprises at least a power amplifier of a mobile station, such as a GSM mobile station.

22. An expansion card (1) as set forth in claim 19, wherein it comprises at least a transmitter/receiver unit (TX/RX) of a mobile station.

23. An expansion card (1) as set forth in claim 19, wherein the electronic device (2) is a handset (16) of a telephone.

24. An expansion card (1) as set forth in claim 19, wherein the power supply (11) is a battery or a mains supply (14).

25. An expansion card interface of an electronic device comprising:
a power supply, a power supply circuit for creating a regulated operating voltage from an unregulated voltage of the power supply of the electronic device, and a power selection switch;
at least one expansion card connector comprising a contact pin for transferring a given signal, and at least one supply pin carrying the operating voltage for directing the operating voltage to an expansion card connected to the expansion card connector; and
wherein said power selection switch is operative to selectively switch a connection of said supply pin from said regulated operating voltage of the power supply circuit to the unregulated voltage of the power supply to accomplish increased power flow from said power supply to said expansion card than is provided by said power supply circuit.

26. An expansion card interface of an electronic device having a power supply, a circuit for regulating an unregulated voltage provided by the power supply to output a regulated voltage, and a pin for connecting voltage from the electronic device to the expansion card, the interface comprising:
a switching circuit, wherein said switching circuit is operative to selectively switch a connection of said pin to an output of said regulating circuit under conditions of relatively low power transmission, and said switching circuit is operative further to selectively switch a connection of said pin to an unregulated output of said power supply under conditions of relatively high power transmission for avoidance of excessive dissipation of power within said regulating circuit.

\* \* \* \* \*